United States Patent
Smits et al.

(10) Patent No.: US 10,214,615 B2
(45) Date of Patent: Feb. 26, 2019

(54) POLYIMIDE COMPOSITION

(71) Applicant: CRODA INTERNATIONAL PLC, Yorkshire (GB)

(72) Inventors: Angela Leonarda Maria Smits, Utrecht (NL); Remco Benjamin Van Triet, Reeuwijk (NL); Theodorus Jacobus Dingemans, Leiden (NL); Santiago Juan Garcia-Espallargas, Delft (NL)

(73) Assignee: Croda International Plc, East Yorkshire (GB)

( * ) Notice: Subject to any disclaimer, the term of this patent is extended or adjusted under 35 U.S.C. 154(b) by 0 days.

(21) Appl. No.: 14/422,900

(22) PCT Filed: Aug. 2, 2013

(86) PCT No.: PCT/GB2013/052073
§ 371 (c)(1),
(2) Date: Feb. 20, 2015

(87) PCT Pub. No.: WO2014/029966
PCT Pub. Date: Feb. 27, 2014

(65) Prior Publication Data
US 2015/0232618 A1 Aug. 20, 2015

(30) Foreign Application Priority Data
Aug. 24, 2012 (GB) .................................. 1215100.7

(51) Int. Cl.
*C08G 73/10* (2006.01)
*C08L 79/08* (2006.01)
*C09D 179/08* (2006.01)
*C09J 179/08* (2006.01)

(52) U.S. Cl.
CPC ....... *C08G 73/1007* (2013.01); *C08G 73/101* (2013.01); *C08G 73/1014* (2013.01); *C08G 73/1042* (2013.01); *C08G 73/1075* (2013.01); *C08G 73/1082* (2013.01); *C08L 79/08* (2013.01); *C09D 179/08* (2013.01); *C09J 179/08* (2013.01)

(58) Field of Classification Search
CPC .......................... C08G 73/1007; C08G 73/101
USPC ....................................................... 528/353
See application file for complete search history.

(56) References Cited

U.S. PATENT DOCUMENTS

| 3,179,614 | A | 4/1965 | Edwards |
| 3,179,630 | A | 4/1965 | Endrey |
| 3,179,631 | A | 4/1965 | Endrey |
| 3,179,632 | A | 4/1965 | Hendrix |
| 3,179,633 | A | 4/1965 | Endrey |
| 3,179,634 | A | 4/1965 | Edwards |
| 3,207,728 | A | 9/1965 | Blomstrom |
| 3,299,101 | A | 1/1967 | Tocker |
| 3,413,267 | A | 11/1968 | Kreuz |
| 3,803,103 | A | 4/1974 | Magay |
| 5,344,983 | A | 9/1994 | Witzel |
| 6,066,710 | A * | 5/2000 | Becker ................. C08G 73/101 528/10 |
| 2004/0225059 | A1 | 11/2004 | Mizori |
| 2005/0080228 | A1* | 4/2005 | Silvi .................. C08G 73/1032 528/310 |
| 2005/0136620 | A1* | 6/2005 | Dershem .................. B32B 7/04 438/455 |
| 2008/0262191 | A1 | 10/2008 | Mizori |
| 2011/0059280 | A1 | 3/2011 | Montarnal |
| 2012/0028061 | A1 | 2/2012 | Matsumoto |

FOREIGN PATENT DOCUMENTS

| EP | 0530696 | | 3/1993 |
| JP | 2002528615 | A | 9/2002 |
| JP | 2006265418 | | 10/2006 |
| JP | 2010151946 | | 7/2010 |
| JP | 2013001730 | A | 1/2013 |
| JP | 2013112735 | A | 6/2013 |
| JP | 2013155329 | * | 8/2013 |
| WO | 200026277 | A1 | 5/2000 |
| WO | 2007116979 | A1 | 10/2007 |
| WO | 2008120764 | | 10/2008 |
| WO | 2011154132 | | 12/2011 |

OTHER PUBLICATIONS

International Preliminary Report on Patentability for International Application No. PCT/GB2013/052073 dated Feb. 24, 2015.
Cordier, P. et al., "Self-healing and thermoreversible rubber from supramolecular assembly," Feb. 21, 2008, pp. 977-980, vol. 451, Nature.
International Search Report for International Application No. PCT/GB2013/052073 dated Sep. 25, 2013.
English language translation of Japanese Office Action for Application No. 2015527961, dated Jan. 25, 2017, 4 pages.

* cited by examiner

Primary Examiner — Tae H Yoon
(74) Attorney, Agent, or Firm — RatnerPrestia

(57) ABSTRACT

Polyimide formed from at least one dianhydride and at least one diamine, wherein at least 50 wt. % of the diamine is comprised of dimer fatty diamine, and a process of making the polyimide. The dianhydride is preferably a tetracarboxylic acid in which carbonyl groups are attached in pair to adjacent carbon atoms, and the dimer fatty diamine may be formed from a corresponding dimer fatty acid, especially the dimerisation products of $C_{10}$ to $C_{30}$ fatty acids such as oleic acid, linoleic acid, linolenic acid, palmitoleic acid, and elaidic acid. Also polyimide pre-polymer being polyamic acid formed by reaction of the dinhydride, and diamine comprised of dimer fatty diamine. The polyimide may be formed in to coatings, adhesives, or polymer films, said compositions in particular being self-healing.

28 Claims, No Drawings

POLYIMIDE COMPOSITION

CROSS REFERENCE TO RELATED APPLICATIONS

This application is the U.S. National Phase application of PCT International Application No. PCT/GB2013/052073, filed Aug. 2, 2013, and claims priority of Great Britain Application No. 1215100.7, filed Aug. 24, 2012, the disclosures of which are incorporated herein by reference in their entireties for all purposes.

FIELD OF INVENTION

The present invention relates to polyimide, a process of making the polyimide, and in particular the use thereof in self-healing polymer coatings, films, or adhesives.

BACKGROUND OF THE INVENTION

Polyimides are polymers formed from imide monomers, and are known having been produced since the 1950s. A number of methods are known for making polyimides, and these include reacting dianhydride and diamine, or reacting dianhydride and diisocyanate. The former is the most common method.

The basic structure of imide monomer is shown below.

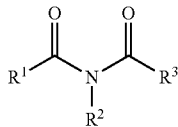

On polymerisation, the resulting product is a polyimide which typically takes one of two forms. The first of these is a linear structure where the atoms of the imide group are part of a linear chain, the second of these structures is a heterocyclic structure where the imide group is part of a cyclic unit in the polymer chain.

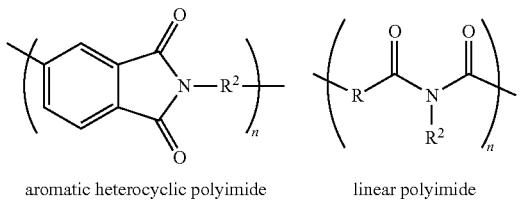

aromatic heterocyclic polyimide     linear polyimide

Typically, most commercial polyimides are aromatic heterocyclic polyimides, with examples includes those sold under the Ultem brand from Sabic Innovative Plastics and those sold under the Kapton from DuPont. These types of polyimides are known for their mechanical and thermal properties which derive from intermolecular forces between the polymer chains, and they are often used in place of metals and glass in many high performance applications in the electronics, automotive, and aerospace industries.

Self-healing is a novel technology which is desired in places that are difficult to access for repairs, applications where reliability and safety are key, and in long lasting or aesthetic applications (e.g. electronics, transportation, aerospace etc.). Existing polyimides polymers are not know to have such properties.

SUMMARY OF THE INVENTION

The present invention therefore seeks to provide polyimide which can exhibit self-healing properties. In particular, the present invention seeks to provide a polyimide with said properties which has mechanical and other physical properties at levels comparable to prior polyimides. The present invention further seeks to provide a method of making the polyimide material having improved properties, and an intermediate used in said method.

The present invention also seeks to provide the use of said polyimide in a coating, adhesive, or polymer film composition, and a coating, adhesive, or polymer film composition comprising said polyimide, wherein said compositions may have desired mechanical and self-healing properties.

The present invention also seeks to provide the use of said polyimide in an adhesive or a polymer film, an adhesive or polymer film comprising said polyimide, wherein said an adhesive or a polymer film may have desired mechanical and self-healing properties.

According to a first aspect of the present invention there is provided polyimide formed from at least one dianhydride and at least one diamine, wherein at least 50 wt. % of the diamine is comprised of dimer fatty diamine.

According to a second aspect of the present invention there is provided a method of making polyimide comprising mixing:
- at least one dianhydride; and
- at least one diamine, wherein at least 50 wt. % of the diamine is comprised of dimer fatty diamine.

According to a third aspect of the present invention there is provided a coating, adhesive, or polymer film composition comprising polyimide, said polyimide being formed from at least one dianhydride and at least one diamine, wherein at least 50 wt. % of the diamine is comprised of dimer fatty diamine.

According to a fourth aspect of the present invention there is provided polyimide pre-polymer, said pre-polymer being polyamic acid which is the reaction product of at least one dianhydride and at least one diamine, wherein at least 50 wt. % of the diamine is comprised of dimer fatty diamine.

According to a fifth aspect of the present invention there is provided the use of polyimide, said polyimide formed from at least one dianhydride and at least one diamine, as a self-healing composition, wherein at least 50 wt. % of the diamine is comprised of dimer fatty diamine.

According to a sixth aspect of the present invention there is provided a self-healing polymer composition, said composition comprising polyimide formed from at least one dianhydride and at least one diamine, wherein at least 50 wt. % of the diamine is comprised of dimer fatty diamine.

DETAILED DESCRIPTION OF THE INVENTION

Surprisingly, it has been found that polyimide formed from dianhydride and dimer fatty diamine provides a polymer material which can have the advantages of providing self-healing properties whilst having comparable other physical properties to existing non-dimer fatty diamine polyimides. Additionally, said polyimide may have desired moisture resistance, whereby the low water absorption results in enhanced electric resistivity plus corrosion protection of substrates. The water absorption of the polyimide may be less than 0.4 wt %, preferably less than 0.2 wt % based on the weight of the polyimide when the polyimide is exposed to water for 24 hours. The polyimide material resulting from the mixture of these components is capable of being stored in a stable state at room temperature.

It has also been found that the cured polyimide polymer produced by thermal or chemical imidisation of pre-polymer polyamic acid, is soluble either in the solvent used for the manufacture of the pre-polymer, or in different solvents (such as toluene). This solubility allows for use of the polyimide in heat sensitive substrates or use of different type of solvents than those used to make the polyamic acid intermediate.

In particular, the self-healing properties of the polyimide may be provided by polyimides where the diamine is comprised of particularly high proportions of dimer fatty amine.

As used herein, the terms 'for example,' 'for instance,' 'such as,' or 'including' are meant to introduce examples that further clarify more general subject matter. Unless otherwise specified, these examples are provided only as an aid for understanding the applications illustrated in the present disclosure, and are not meant to be limiting in any fashion.

It will be understood that, when describing the number of carbon atoms in a substituent group (e.g. '$C_1$ to $C_6$ alkyl'), the number refers to the total number of carbon atoms present in the substituent group, including any present in any branched groups. Additionally, when describing the number of carbon atoms in, for example fatty acids, this refers to the total number of carbon atoms including the one at the carboxylic acid, and any present in any branch groups.

The dianhydride will be understood to be any tetravalent radical containing at least two carbon atoms having no more than two free valencies at any one carbon atom. Preferably, the dianhydride is a tetracarboxylic acid in which carbonyl groups are attached in pair to adjacent carbon atoms, or to a pair of carbon atoms separated by only one other atom, so that each resulting imide group in the unit forms part of a 5 or 6 membered ring.

The dianhydride may be any of one or more tetracarboxylic acids or anhydrides used or disclosed in the literature as suitable for use in the manufacture of polyimides.

Suitable materials may include, but are not limited to, those described in U.S. Pat. Nos. 3,179,614, 3,179,630, 3,179,631, 3,179,632, 3,179,633, 3,179,634, 3,207,728, 3,299,101, and 3,413,267 which are all incorporated herein by reference.

Suitable acids may include pyromellitic acid, 3,4,3',4'-benzo-phenonetetracarboxylic acid, 2,3,6,7-naphthaene tetracarboxylic acid, 3,3',4,4'-diphenyl tetracarboxylic acid, 1,2,5,6-naphthalene tetracarboxylic acid, 2,2',3,3'-diphenyl tetracarboxylic acid, 2,2-bis(3,4-dicarboxyphenyl)propane, 3,4,9,10-perylene tetracarboxylic acid, bis(3,4-dicarboxyphenyl)ether, thylene tetracarboxylic acid, naphthalene-1,2,4,5-tetracarboxylic acid, naphthalene-1,4,5,8-tetracarboxylic acid, decahydronaphthalene-1,4,5,8-tetracarboxylic acid, 4,8-dimethyl-1,2,3,5,6,7-hexahydronaphthalene-1,2,5,6-tetracarboxylic acid, 2,6-dichloronaphthalene-1,4,5,8-tetracarboxylic acid, 2,7-dichloronaphthalene-1,4,5,8 -tetracarboxylic acid, 2,3 ,6,7-tetrachloronaphthalene-1,4,5,8-tetracarboxylic acid, phenanthrene-1,8,9,10-tetracarboxylic acid, cyclopentane-1,2,3,4-tetracarboxylic acid, pyrrolidine-2,3,4,5-tetracarboxylic acid, pyrazine-2,3,5,6-tetracarboxylic acid, 2,2-bis(2,3-dicarboxyphenyl) propane, 1,1-bis(2,3-dicarboxyphenyl) ethane, 1,1-bis(3,4-dicarboxyphenyl) ethane, bis(2,3-dicarboxyphenyl) methane, bis(3,4-dicarboxyphenyl) methane, bis(3,4-dicarboxyphenyl) sulphone, benzene-1,2,3,4-tetracarboxylic acid, 1,2,3,4-butane tetracarboxylic acid, thiophene-2,3,4,5-tetracarboxylic acid, 3,4,3',4'-benzophenone tetracarboxylic acid, 2,3,2',3'-benzophenone tetracarboxylic acid, 2,3,3',3'-benzophenone tetracarboxylic acid, tetrahydrofuran 2,3,4,5-tetracarboxylic acid, or combinations thereof.

In particular, preferred dianhydrides may be selected from 3,3',4,4'-biphenyltetracarboxylic dianhydride, 2,3,3',4'-biphenyltetracarboxylic dianhydride, pyromellitic dianhydride, 3,3',4,4'-benzophenone tetracarboxylic dianhydride, 3,3',4,4'-diphenyl ether tetracarboxylic dianhydride, and 1,4-hydroquinone dibenzoate-3,3',4,4'-tetracarboxylic dianhydride.

The dianhydride may be selected from examples, 4,4'-oxydiphthalic dianhydride obtainable from Eurolabs Limited), pyromellitic dianhydride (obtainable from Evonik), 1,2,3,4-butane-tetracarboxylic dianhydride (obtainable from New Japan Chemicals Co. Ltd.), benzophenone tetra carboxylic dianhydride (obtainable from Evonik), 3,3',4,4'-biphenyl tetracarboxylic dianhydride (obtainable from Akron Polymer Systems).

The dianhydride, as used for forming the polyimide, may be homogeneous in that the dianhydride is comprised of only one specific dianhydride selected from those listed above.

In an alternative embodiment, the dianhydride starting material may be heterogeneous in that it comprises a mixture of a number of different dianhydrides selected from those listed above.

In practice the dianhydrides may typically be derived from synthetic sources, and as such usually each dianhydride used will be of a homogenous form.

The dimer fatty diamine used in the present invention is preferably formed from the corresponding dimer fatty acid.

The terms dimer fatty acid is well known in the art, and refer to the dimerisation products of mono or polyunsaturated fatty acids and/or esters thereof. The related term trimer fatty acid similarly refers to trimerisation products of mono-or polyunsaturated fatty acids and/or esters thereof.

Dimer fatty acids are described T. E. Breuer, 'Dimer Acids', in J. I. Kroschwitz (ed.), Kirk-Othmer Encyclopedia of Chemical Technology, 4th Ed., Wily, New York, 1993, Vol. 8, pp. 223-237. They are prepared by polymerising fatty acids under pressure, and then removing most of the unreacted fatty acid starting materials by distillation. The final product usually contains some small amounts of mono fatty acid and trimer fatty acids, but is mostly made up of dimer fatty acids. The resultant product can be prepared with various proportions of the different fatty acids as desired.

The ratio of dimer fatty acids to trimer fatty acids can be varied, by modifying the processing conditions and/or the unsaturated acid feedstock. The dimer fatty acid may be isolated in substantially pure form from the product mixture, using purification techniques known in the art, or alternatively a mixture of dimer fatty acid and trimer fatty acid may be employed to produce the corresponding amines.

The dimer fatty diamine and optional trimer fatty triamine may be produced from the corresponding dimer fatty acid and optional trimer fatty acid by many standard chemical methods known in the art, for example by reacting the fatty acid with ammonia followed by hydrogenation as described in EP0530696. An example route starts from the dimer acid which is converted via the dimer diamide into the dimer dinitrile.

The purity of the resulting dimer diamine produced may be varied by alteration of the reaction conditions, and/or may be purified further after the reaction.

As noted above, it will be understood that the dimer diamine used in the present invention may comprise other amine components which have resulted from the reaction process, such as monomer fatty amines, trimer fatty amines, or oligo fatty amines.

The dimer fatty diamines are preferably derived from the dimerisation products of $C_{10}$ to $C_{30}$ fatty acids, more preferably $C_{12}$ to $C_{24}$ fatty acids, particularly $C_{14}$ to $C_{22}$ fatty acids, further preferably $C_{16}$ to $C_{20}$ fatty acids, and especially $C_{18}$ fatty acids. Thus, the resulting dimer fatty acids preferably comprise in the range from 20 to 60, more preferably 24 to 48, particularly 28 to 44, further preferably 32 to 40, and especially 36 carbon atoms.

The molecular weight (weight average) of the dimer fatty diamine may preferably be in the range from 450 to 690, more preferably 500 to 640, particularly 530 to 610, and especially 550 to 590.

The dimer fatty diamines may be derived from fatty acids which are selected from linear or branched unsaturated fatty acids. The unsaturated fatty acids may be selected from fatty acids having either a cis/trans configuration, and may have one or more than one unsaturated double bonds.

Preferably, the fatty acids used are linear monounsaturated fatty acids.

Suitable dimer fatty diamines are preferably derived from (i.e. are amine equivalents of) the dimerisation products of oleic acid, linoleic acid, linolenic acid, palmitoleic acid, and elaidic acid. In particular, suitable dimer fatty diamines are derived from oleic acid.

The dimer fatty diamine may also be derived from the dimerisation products of unsaturated fatty acid mixtures obtained from the hydrolysis of natural fats and oils, e.g. of sunflower oil, soybean oil, olive oil, rapeseed oil, cottonseed oil and tall oil. Hydrogenated dimer fatty acids may also be employed to produce the corresponding dimer fatty diamine.

In addition to the dimer fatty acids, from which the dimer fatty diamines are derived, dimerisation usually results in varying amounts of trimer fatty acids (so-called "trimer"), oligomeric fatty acids, and residues of monomeric fatty acids (so-called "monomer"), or esters thereof, being present. The amount of monomer can, for example, be reduced by distillation.

Similarly, the optional trimer fatty triamines are preferably derived from the trimerisation products of the materials mentioned with regard the dimer fatty diamines, and are preferably trimers of $C_{10}$ to $C_{30}$, more preferably $C_{12}$ to $C_{24}$, particularly $C_{14}$ to $C_{22}$, further preferably $C_{16}$ to $C_{20}$ fatty acids, and especially $C_{18}$ fatty acids. Thus, the trimer fatty triamines preferably contain in the range from 30 to 90, more preferably 36 to 72, particularly 42 to 66, further preferably 48 to 60, and especially 54 carbon atoms.

The molecular weight (weight average) of the trimer fatty triamine is preferably in the range from 750 to 950, more preferably 790 to 910, particularly 810 to 890, and especially 830 to 870.

In one embodiment of the present invention, tetramer fatty tetraamines and higher oligomers (hereinafter both referred to as oligomeric fatty acids or amines) are formed during production of the amine from the trimer fatty acid and/or dimer fatty acid and/or mono fatty acid. Such oligomeric fatty amines may therefore also be present in the dimer fatty diamine use in the polyimide according to the present invention in combination with trimer fatty triamine and/or dimer fatty diamines and/or mono fatty monoamines.

The oligomeric amines are preferably oligomers, containing 4 or more units derived from $C_{10}$ to $C_{30}$, more preferably $C_{12}$ to $C_{24}$, particularly $C_{14}$ to $C_{22}$, and especially $C_{18}$ fatty acids. The molecular weight (weight average) of the oligomeric amine is suitably greater than 1,000, preferably in the range from 1,200 to 1,800, more preferably 1,300 to 1,700, particularly 1,400 to 1,600, and especially 1,400 to 1,550.

The diamine used in the present invention preferably may have a dimer fatty diamine (or dimer) content of greater than 60 wt. %. More preferably, the dimer content is greater than 70 wt. %. Further preferably, greater than 80 wt. %. Particularly preferably, greater than 90 wt. %. Even further preferably, greater than 95 wt. %. Most preferably, greater than 98 wt. %.

In one embodiment, the diamine preferably has a dimer fatty diamine content of 100 wt. %.

In addition, particularly preferred diamines have a trimer fatty triamine (or trimer) content of less than 40 wt. %. More preferably, less than 30 wt. %. Further preferably, less than 20 wt. %. Particularly preferably, less than 10 wt. %. Even further preferably, less than 5 wt. %. Most preferably, less than 1 wt. %.

In one embodiment, the diamine has a trimer fatty triamine content of 0 wt. %.

Furthermore, the diamine may have a mono fatty monoamine (or monomer) content of less than 10 wt. %. More preferably, less than 6 wt. %. Further preferably, less than 4 wt. %. Particularly preferably, less than 3.5 wt. %. Even further preferably, less than 2 wt. %. Most preferably, less than 0.5 wt. %.

In one embodiment, the diamine has a mono fatty monoamine content of 0 wt. %.

All of the above weight percentage values are based on the total weight of diamine (i.e. the total amount of monomer, dimer, trimer, and oligomer amine present).

It has been found that the polyimides of the present invention may exhibit improved properties in particular when using relatively high purity dimer fatty diamine, i.e. diamine comprising a high proportion of dimer fatty diamine and very low proportions of monomer, trimer, and oligomer fatty amines. In particular, this high purity is believed to be needed in order to form high molecular weight polyimide polymers which results in desired mechanical properties.

Additionally, the diamine preferably comprises no or very low amounts of residue of the catalysts used in the process of forming them, and very low amounts of any other metal ions. Preferably, the diamine comprises less than 10 wt. % of catalyst residue or other metal ions. More preferably, less than 5 wt. %. Further preferably, less than 1 wt. %. Most preferably, less than 0.6 wt. %.

Additionally, the presence of halide ions in the dimer fatty diamine may also lead to a weakening of the properties of coating or films made using the polyimide. Preferably, the dimer fatty diamine comprises less than 4 mg/kg of said halide ions. More preferably, less than 2 mg/kg. Most preferably, less than 1 mg/kg of said halide ions.

The dimer fatty diamine preferably has an amine value in the range from 140 mgKOH/g to 300 mgKOH/g, more preferably from 170 mgKOH/g to 250 mgKOH/g, particularly 190 mgKOH/g to 230 mgKOH/g, and most preferably 200 mgKOH/g to 210 mgKOH/g.

Hydroxyl Values (OH) were measured using a method based upon BS 684 Section 2.9 (1976) and results are quoted in mgKOHIg (sample), and are corrected for the contribution of acid OH groups.

Preferably, the amine functionality of the dimer fatty diamine is greater than 1.8, more preferably greater than 1.9, most preferably greater than 1.97. Preferably, the amine functionality of the dimer fatty diamine is less than 2.3. In a particularly preferred embodiment, the amine functionality of the dimer fatty diamine is in the range from 1.97 to 2.03. Said average being measured across a bulk amount of dimer fatty diamine.

Preferably the dynamic viscosity of the dimer fatty diamine (at 25° C.) is in the range from 200 to 300 mPa·s, more preferably in the range from 220 to 370 mPa·s, most preferably in the range from 240 to 260 mPa·s.

The dimer fatty amine, as used for forming the polyimide, may be homogeneous in that the dimer fatty amine is comprised of only one specific dimer fatty amine selected from the above listed groups.

In an alternative embodiment, the starting material may be heterogeneous in that it comprises a mixture, for example a mixture of a number of different diamines.

Where heterogeneous mixtures are used, it is preferred that the dimer fatty amine components are at least 60 wt. % of a single identity. More preferably, at least 80 wt. % of a single identity. Further preferably, at least 90 wt. % of a single identity. Most preferably, at least 95 wt. % of a single identity.

The polyimide may be formed from (or further comprise) diamines which are not dimer fatty diamines. Said diamines may be selected from those known in the art for making polyimides. Suitable such diamines may be selected from 4,4'-oxydianiline, 4,4'-diaminodiphenyl ether, 3,4'-diaminodiphenyl ether, 3,3'-diaminodiphenyl ether, o-tolidine, m-tolidine, and 4,4'-diaminobenzanilide, p-phenylenediamine, and m-phenylenediamine.

The diamine may comprise dimer fatty diamine and one or more diamines selected from 4,4'-oxydianiline, 4,4'-diaminodiphenyl ether, 3,4'-diaminodiphenyl ether, 3,3'-diaminodiphenyl ether, o-tolidine, m-tolidine, and 4,4'-diaminobenzanilide, p-phenylenediamine, and m-phenylenediamine.

The diamine may comprise dimer fatty diamine and less than 50 wt. %, preferably less than 40 wt. %, more preferably less than 30 wt. %, even more preferably less than 20 wt. %, yet more preferably less than 10 wt. % of one or more diamines selected from 4,4'-oxydianiline, 4,4'-diaminodiphenyl ether, 3,4'-diaminodiphenyl ether, 3,3'-diaminodiphenyl ether, o-tolidine, m-tolidine, and 4,4'-diaminobenzanilide, p-phenylenediamine, and m-phenylenediamine.

Polyimides are typically prepared by reacting dianhydride and diamine (the most used method), or alternatively by reacting dianhydride and diisocyanate. Polyimide of the present invention is preferably prepared by reacting dianhydride and diamine.

The process may be undertaken in customary solvents in which the starting materials and the catalyst dissolve. Examples of suitable solvents may be those based upon hydrocarbons or alcohols.

The polyimides may be formed using a two-step synthesis. This method comprises reacting dianhydride with diamine at ambient conditions, and using a dipolar aprotic solvent to yield polyamic acid intermediate. The polyamic acid may then be cyclised by dehydration and imidisation (either thermal imidisation or chemical imidisation) to produce the final polyimide polymer.

The polyamic acid may have a viscosity of less than 5000 mPa·s at 20° C., preferably less than 2000 mPa·s. The polyamic acid may have a solids content of up to 35 wt. %, preferably up to 30 wt. %.

Thermal or chemical imidisation (curing) of the polyamic acid may be achieved in solvent and the cured (dry) polyimide may be dissolved. This allows for application of the polyimide on to heat sensitive substrates, or use of different type of solvents, in the end-use application, than those used to make the polyamic acid itself.

The dipolar aprotic solvent may be selected from N,N-dimethylacetamide (DMAc), N-methylpyrrolidone (NMP), γ-butyrolacton (GBL), tetrahydrofuran (THF), or dimethylsulphoxide (DMSO).

The solvent may be selected from N,N-dimethylacetamide (DMAc), N-methylpyrrolidone (NMP), γ-butyrolacton (GBL), toluene, xylene or mixtures thereof.

The formation of polyamic acid intermediate is an exothermal reaction and an equilibrium is favoured at lower temperatures. A different factor affecting the reaction equilibrium is the "monomer" concentration. As the forward reaction of forming the polyamic intermediate is bimolecular and the reverse reaction is unimolecular, increasing the "monomer" concentration in the solvent may favour higher molecular weight products.

In an alternative embodiment to forming the polyimide from dianhydride with diamine, copolymers may be formed comprising at least one additional component monomer. For example, the polyimide of the present invention may be mixed with other polyimides or polymers.

A further example copolymer comprises forming the polyimide from a mixture of least one dianhydride, a first diamine wherein at least 50 wt. % of the diamine is comprised of dimer fatty diamine, and at least one further diamine which comprise less than 50 wt. % dimer fatty diamine or no dimer fatty diamine, to form an alternating block copolymer polyimide.

The method of making polyimide may comprise use of a chain stopper which can be added to control the molecular weight of the formed polymer. Suitable chain stoppers may be added to the reaction at low amounts. The chain stopper may be selected from mono-anhydrides, and by way of example, phthalic anhydride.

Existing polyimides are known high performance polymers because of their good thermal properties, good wear and friction properties, good electrical properties (low conductivity), chemical inertness, dimensional stability, radiation and cryogenic temperature stability, and non-flammability.

Existing polyimides are mainly used in (optical) electronics, aviation and space industry, oil & gas industry (often as reinforced polyimides and polyimide membranes), and the automotive industry. They may also be usable in film, adhesive and coating applications and as moulded parts. It is envisaged that the polyimide of the present invention may also be usable in the same way as existing polyimides. The polyimide may be used in electronics, optical applications, transportation, space applications or oil and gas applications.

The molecular weight (weight average) of the polyimide of the present invention may be in the range 10,000 to 300,000. Preferably, in the range from 30,000 to 220,000. Most preferably, in the range from 32,000 to 150,000.

The polyimide may dissolve in organic solvents. This may be distinct from existing polyimides which may be undissolvable in organic solvents. The cured polyimide may dissolve in an aprotic organic solvent. The cured polyimide may dissolve in a solvent selected from N,N-dimethylacetamide (DMAc), N-methylpyrrolidone (NMP), γ-butyrolactone (GBL), toluene, xylene or mixtures thereof.

The polyimide may be able to withstand the onset of thermal decomposition (500° C.-520° C.), and may withstand a tension of 50 meganewtons per square meter (MN/m$^2$), or 500 kilograms-force per square centimeter (kgf/cm$^2$), at 300° C.

The polyimide may not be subject to thermal degradation or decomposition at a temperature of 400° C.

The polyimide may have a maximum load of at least 15 MPa.

Due to its low $T_g$ and flexibility, incorporation of dimer diamine, especially at high dimer loadings, polymers will have a certain degree of fusibility/mobility, possibly allowing self-healing. Although this self-healing is not achieved by supramolecules, dimer derivatives are suitable building blocks for this concept. This fusibility should also allow injection moulding of polyimides.

A different effect of its fusibility is that polyimides containing high levels of dimer diamine modifier can dissolved in solvents like toluene, possibly allowing spraying applications. Allowing spraying applications, allowing the use of different solvent types than those currently used for polyamic acid, allowing dissolving of polyimides for coating or adhesive removal, and allowing use on temperature sensitive substrates.

The dissolved polyimide solution may be used in a coating, adhesive, or film composition.

The polyimide of the present invention is found to exhibit self-healing properties. Self-healing will be understood to refer to the ability of a material to be able to heal itself. For a material to be self-healing, cracks and other damage would have to be repaired and effectively disappear within a short time frame after such damage was incurred. Preferably this self-healing should be obtained without an external stimulus.

Self-healing polyimides of the present invention may find particular use in application to locations which may be difficult to access and thus expensive to repair by conventional means.

Without wishing to be unduly bound by theory, it has been found that the benefits of the invention may be conferred due to a combination of several effects, and may be related at least in part to hydrogen bond formation as well as the presence of more 'liquid' parts of the polymer chain which are able to move/fuse (depending on the content of dimer diamine) even without the presence of an additional heat source.

Self-healing may be observable with the polyimide after cutting a material made therefrom, and having cut it bringing the edges of the cut back into contact and the cut being healed.

The polyimide may have elastomeric properties which allow it to undergo, for example, a tensile deformation of at least 100%, or even of at least 200%, before break, and to recover its initial dimensions once the stress has been removed, with a remnant deformation of less than 10% of its initial dimension.

The polyimide may be suitably used as a material for an electronic component such as a printed wiring board, a flexible printed circuit board and a TAB tape, and exhibit excellent mechanical properties over a wide temperature range, and have long-term heat resistance, high resistance to hydrolysis, a high thermal-decomposition initiation temperature, a low heat shrinkage ratio, a low thermal expansion coefficient, and high flame resistance.

The polyimide may also be used in adhesive compositions. The adhesive may preferably be applicable to a suitable substrate, preferably wood, in situ as a free flowing viscous solid, and cured.

Adhesives based on polyimide of the present invention are for example, used for the lamination of furniture front panels and automotive interior trim parts. In these applications, strong and reliable initial bond strength is essential as the finished parts are often processed further immediately after the bonding process and short cycle times are fundamental.

The adhesive may also comprise other optional components such as fillers, for example nylon, glass fibre, fumed silica, wood flour; and other agents such as pigments, antioxidants, stabilizers, flow additives etc.

Dimer derivatives have been found suitable in adhesives as they improve adhesion to certain substrates that are found to be difficult to adhere.

Polyimides may be used in coating compositions. Coating compositions can be a single-layer coating or a primer (or primer-basecoat combined). Coating or adhesive can be on metal or composite-resin substrate, especially for electronic and (aero)space applications, and on polyester or metal, especially for solar cells.

In these applications, the material according to the invention can be used as it is or in single-phase or multi-phase mixtures, with one or more compounds such as petroleum fractions, solvents, inorganic and organic fillers, plasticisers, tackifying resins, antioxidants, pigments and/or dyes, for example, in emulsions, suspensions or solutions. The polyimide may also be used in in blend, homogeneous or preferably multi-phase, with other polymers.

All of the features described herein may be combined with any of the above aspects, in any combination.

EXAMPLES

In order that the present invention may be more readily understood, reference will now be made, by way of example, to the following description.

It will be understood that all tests and physical properties listed have been determined at atmospheric pressure and room temperature (i.e. 20° C.), unless otherwise stated herein, or unless otherwise stated in the referenced test methods and procedures.

Mechanical Properties Testing of Films

Mechanical properties measurements are performed on an Instron series IX 4464 with a load cell of 2kN. The measurements are performed on polyimide film strain bars having a height of 10-11 cm and a width of 1 cm. These strain bars were cut from the prepared polyimide films. The following mechanical properties were measured:

Maximum load (MPa)—the highest load produced during a test, representing max strength.

Break Strain (%)—the percentage strain of the specimen at the break point, i.e. maximum elongation.

Strain—change per unit length in a linear dimension of a part or specimen, expressed in percentage strain, as used with most mechanical tests, is based on original length of the specimen.

Modulus 100% and 300%—the force in $kg/cm^2$ required to produce a certain elongation (strain), usually 100%; a good indication of toughness and resistance to extrusion.

Toughness—toughness is the resistance of a material to break. Measured in units of energy and is expressed as energy to break (J) divided by the multiplication of the gauge length, specimen width, specimen thickness (all in mm).

Modulus—the ratio of the uniaxial stress over the uniaxial strain.

Compounds as used in the following examples are identified as follows, along with abbreviations and supplier where appropriate:

Amines 4,4'-oxydianiline (4,4'-diaminodiphenyl ether) [4,4'-ODA]—Akron Polymer Systems 3,4'-oxydianiline (3,4'-diaminodiphenyl ether) [3,4'-ODA]—Eurolabs Limited $C_{36}$ dimer diamine, derived from oleic acid [DD1]—Croda Anhydrides 4,4'-oxydiphtalic dianhydride [ODPA]—Eurolabs Limited Pyromellitic dianhydride [PMDA]—Evonik 1,2,3,4-butane-tetracarboxylic—Rikacid BT-100, RBT New Japan Chemicals Co. Ltd.

Benzophenone tetra carboxylic dianhydride [BTDA]—Evonik 3,3',4,4'-biphenyl tetracarboxylic dianhydride [BPDA]—Akron Polymer Systems Phthalic anhydride [PA]

Existing Polyimides

LaRC-IA—Reaction product of ODPA and 3,4'-ODA

Kapton—Reaction product of PMDA and 4,4'-ODA

Upilex-R—Reaction product of BPDA and 4,4'-ODA

Solvents

N,N-dimethylacetamide [DMAC]

N-methylpyrrolidone [NMP]

γ-butyrolacton [GBL]

Dimethylsulphoxide [DMSO]

Tetrahydrofuran [THF]

Toluene [TOL]

Film Preparation

Glass plate is cleaned with isopropyl alcohol and a layer of 500 or 1,000 um is applied onto the glass plate, depending upon solid concentration. The coated glass plate is put into a vacuum oven at 80-100° C. under nitrogen sparging. Once the coated glass plate is tack-free, the oven is heated to 200° C. and kept at this temperature for 2 hours, while nitrogen sparging is maintained. The vacuum oven is levelled to avoid run out of the liquid.

After 2 hours nitrogen sparging is stopped and a vacuum of 10 mbar is applied. These conditions are maintained for 4 hours. The coated glass plate is allowed to cool down to room temperature. To remove the film layer the glass plate is inserted into water of approx. 60° C. Depending on the composition, higher dimer diamine content may require longer water insertion time, the glass plate is kept in water until the film releases or is easy to peel off. Finally the film is wiped dry.

Synthesis of Polyamic Acid Solutions

Preparation of polyimides can be described in general by the following method. The diamine is dissolved in a minor part aprotic polar solvent. The dianhydride, and if required, the mono-anhydride end-cap are mixed in a part of the solvent. The main part of the solvent is added into the reactor. The anhydride containing solution is added slowly to the reactor at 25° C., followed by rinsing with solvent. The diamine solution is added to the reactor under stirring at 25° C., atmospheric pressure and nitrogen flow, followed by rinsing with the solvent.

Often solids will form that disappear rapidly upon stirring. Dimer diamine related solids may require more time to dissolve and the amount of solid present and the time required to dissolve is strongly related to an increased amount of dimer diamine. Dimer diamine dissolves slowly in aprotic polar solvents.

Addition rate of ingredients and stirring speed (e.g. high shear mixing) do not reduce the amount of solids formed. Reaction rate of dimer diamine is slower than aromatic diamines. Mixture (polyamic acid in solvent) is kept at 25° C., atmospheric pressure and nitrogen flow for 4 to 70 hours depending upon solubility rate and the reaction rate After preparation of the polyamic acid solution, the mixture is filtered either by vacuum filtration (10 mbar) over 2 μm filter for thin polyamic acids, or at room temperature or by pressure filtration (2 bar nitrogen) over 2 μm filter for high viscous polyamic acids at a maximum temperature of 60° C. Polyamic acid solutions can be stored in amber glass bottles under nitrogen in a refrigerator for several weeks.

The filtered polyamic acid solution can be used to prepare films as described above.

Imidisation of Polyamic Acid to Polyimide

The polyimide is formed from imidisation of the polyamic acid by the following methods:

Chemically—using glacial acetic acid at 120° C. and allowing to distil off water; or Azeotropic distillation—using toluene at 160° C. to remove water (gives two layers in receiver, toluene layer is fed back into reactor.

For both distillation methods 10 wt. % acetic acid or toluene is added. The reaction is deemed to be finished when no water distils off.

The formed polyimide is cooled down to room temperature. A solid polyimide is formed or the polyimide may remain in solution. The latter is often the case when using dimer diamine as main amine component.

The polyimide/solvent mixture is dispersed in ethanol by high shear mixing, followed by filtration. The filtrate is washed with ethanol and re-filtered. Drying is done in a vacuum oven at 4 hours at 120° C. and under nitrogen sparging, and 4 hours at 120° C. and 10 mbar.

Modification of Polyimide with Dimer Diamine

LaRC-IA is a polyimide developed by the NASA Langley Research Centre. It is made of 4,4'-ODPA and 3,4'-ODA giving a semi-crystalline polymer. In order to obtain a polyimide of the present invention having self-healing properties an amount of the 3,4'-ODA is replaced by DD1. A formulation is shown in Table 1.

TABLE 1

| LaRC-IA polyimide of DD1 and 4,4'-ODPA | | | |
|---|---|---|---|
| Theoretical Mol. Wt. (Da) | Chemicals (g) | % mol/mol | Solvent/Solids Content |
| 32000 | 50.27 g DD1 | 50.00 | 401 g DMAc |
|  | 28.25 g ODPA | 47.50 | 16.5 w % solids |
|  | 0.71 g PA | 2.50 |  |

At 100% replacement by DD1 self-healing elastomeric material is obtained. Cutting the material in half, without applying heat or pressure, the material is whole and strong again after 24 hours.

The polyimide obtained is a thermoplastic polyimide which is very flexible even down to −50° C. and stable at temperatures above 400° C.

TGA (Thermogravimetric analysis) was performed on the polyimide of Table 1. TGA is a type of testing performed on samples that determines changes in weight, due to evaporation or degradation, in relation to temperature. Polymer degradation was found to start well above 400° C. This indicates that self-healing can be achieved at room temperature without having a detrimental effect on the temperature stability of the polyimide.

DSC analysis was performed on the polyimide of Table 1. Differential scanning calorimetry or DSC is a thermoanalytical technique in which the difference in the amount of heat required to increase the temperature of a sample and reference is measured as a function of temperature. Both the sample and reference are heated at 10° C/min, from −130 to 235° C., cooled back to −90° C. followed by a second heating to 235° C. The DSC plot shows the self-healing polyimide to have a glass transition temperature of approximately −4.5° C., as indicated by a step-transition. Combined with the TGA analysis, this shows that the polyimide may be usable between −5° C. up to possibly 400° C.

DMTA analysis was performed on the polyimide of Table 1. Dynamic Mechanical Thermal Analysis (abbreviated DMTA) is a technique used to study and characterise materials. It is most useful for studying the viscoelastic behavior of polymers. A sinusoidal stress is applied and the strain in the material is measured, allowing determination of the complex modulus. The temperature of the sample or the frequency of the stress are varied, leading to variations in the complex modulus. This approach can be used to locate the glass transition temperature ($T_g$) of the material and to identify transitions corresponding to other molecular motions. At the glass transition, the storage modulus was found to decrease dramatically and the loss modulus reached a maximum. The DMTA analysis showed a $T_g$ onset at −10° C. and midpoint about 10° C. A second transition (modulus loss) was observed at around 65° C., with an onset at about 35° C. This transition refers to polymer chain segment mobility.

Viscosity Effect of Modification of Polyimide with DD1

DuPont's Kapton (made from PMDA and 4,4'-ODA) was the first commercial polyimide (film). Kapton polyimides are resistant to temperatures from −180° C. up to about 240° C. for continuous service, and as high as 400° C. for brief periods without significant loss of mechanical and electrical properties, due to its crystalline nature.

Existing polyimides are resistant to organic solvents and radiation. One drawback of conventional polyimides is their tendency to absorb moisture, as much as 2.9 wt. % when exposed to water for 24 hours. Modification of existing polyimides by use of DD1 was found to reduce the water/moisture absorption and will bring more flexibility into the polymer chain.

TABLE 2

Solutions of polyamic acid (PAA) of PMDA and 4,4'-ODA/DD1 (50/50 mol. %)

| Wt. % solids | Ratio DD1/4,4-ODA (mol/mol %) | Viscosity (mPa · s) | Solvent | Appearance |
|---|---|---|---|---|
| 15 | 50/50 | 48.0 | DMAc/tol | clear |
| 20 | 50/50 | 104.0 | DMAc/tol | clear |
| 25 | 50/50 | 342.4 | DMAc/tol | clear |
| 30 | 50/50 | 972.8 | DMAc/tol | slightly hazy |
| 35 | 50/50 | 4260 | DMAc/tol | hazy |
| 40 | 50/50 | 26460 | DMAc/tol | hazy |
| 15 | 50/50 | 53.5 | DMAc | clear |
| 25 | 50/50 | 508.8 | DMAc | clear |
| 30 | 50/50 | 1375 | DMAc | almost clear |
| 15 | 0/100 | 8800 | DMAc | clear |

* ratio of DMAc/toluene is 2:1 v/v

Viscosity profiles were taken of the different modified polyimides shown in Table 2. It was found that the modification of Kapton with DD1 reduces the viscosity of the polyamic acid solution. This can be explained by the presence of flexible dimer-based building block and due to pending alkane groups (branches) of dimer diamine.

The polyamic acids containing 35 and 40 wt. % solids were hazy. The 30 wt. % solids polyamic acid solution in DMac/toluene was slightly hazy, while with only DMAc the mixture was almost clear. Below 30 wt. % solid concentration all polyamic acid solutions were clear. As the amount of solvent increases the solubility increases.

Lowering solvent content will have processing advantages due to faster drying, allowing faster handling and less energy use.

Testing of Polyimides Properties

Several polyamic acids were applied onto glass plates to obtain polyimide films with varying amounts of dimer diamine DD1. The layer thickness applied for testing film properties was 1,000 μm. As the polyamic acid solutions contain 15 wt % polyamic acid, the final film had a thickness of about 150 μm. The polyamic acid was imidised in an oven at 200° C. under nitrogen sparging.

The results of the film testing for various polyimides are shown in Tables 3 and 4.

TABLE 3

Results of film testing of modified LaRC-IA polyimide with DD1 (random copolymer)

| Mol. % DD1 | Max. Load (MPa) | Break Strain (%) | 100% modulus (kg/cm$^2$) | 300% modulus (kg/cm$^2$) | Toughness (MPa) | Modulus (MPa) |
|---|---|---|---|---|---|---|
| 0 | 109.6 | 95.04 | 910.4 | 1030 | 90.12 | 2147 |
| 10 | 104.4 | 12.66 | — | — | 7.891 | 1964 |
| 27 | 75.63 | 74.68 | 650.3 | 672.5 | 46.28 | 1523 |
| 50 | 48.18 | 133.8 | 422.0 | 406.3 | 56.52 | 1003 |
| 65 | 48.90 | 256.3 | 269.2 | 295.5 | 91.00 | 626.1 |
| 77 | 43.37 | 330.1 | 183.3 | 187.1 | 85.64 | 481 |
| 90 | 28.44 | 383.9 | 49.98 | 62.51 | 53.08 | 102.3 |
| 100 | 17.53 | 456.0 | 11.03 | 16.4 | 26.17 | 14.38 |

TABLE 4

Results of film testing of modified LaRC-IA polyimide with DD1 (block copolymer)

| Mol. % DD1 | Max. Load (MPa) | Break Strain (%) | 100% modulus (kg/cm$^2$) | 300% modulus (kg/cm$^2$) | Toughness (MPa) | Modulus (MPa) |
|---|---|---|---|---|---|---|
| 0 | 109.6 | 95.04 | 910.4 | 1030 | 90.12 | 2147 |
| 10 | 114.0 | 11.55 | — | — | 7.462 | 1882 |
| 27 | 73.57 | 36.78 | 617.3 | — | 20.23 | 1483 |
| 50 | 52.46 | 208.9 | 350.6 | 377.2 | 85.88 | 815.5 |
| 77 | 30.59 | 254.4 | 156.4 | 171.5 | 52.55 | 349.9 |
| 90 | 18.86 | 278.9 | 49.38 | 65.6 | 28.81 | 58.15 |
| 100 | 17.53 | 456.0 | 11.03 | 16.4 | 26.17 | 14.38 |

The film appearance of the polyimides shown in Tables 3 and 4 was assessed and is shown in Table 5.

TABLE 5

Film appearance of LaRC-IA modified with DD1

| Mol % DD1 (random) | Appearance of film | Mol. % DD1 (blocky) | Appearance of film |
|---|---|---|---|
| 0 | transparent | 0 | transparent |
| 10 | transparent | 10 | transparent |
| 27 | transparent | 27 | transparent |
| 50 | hazy | 50 | hazy |
| 65 | hazy | 77 | transparent |
| 77 | transparent | 90 | slightly hazy |
| 90 | slightly hazy | 100 | almost transparent |
| 100 | almost transparent | | |

The modulus results show that the incorporation of diamine results in less stiff and rigid materials/films, which is to be expected given the flexible low $T_g$ nature of dimer diamine. At 100% DD1 the material is highly flexible.

From the maximum elongation (Break Strain) figure it can be concluded that modification at low levels of DD1 (<30 mol. %) is unfavourable to improve elongation. At these low levels the ability to stretch before break is limited. However, DD1 does make the material softer, as can be seen from the reduced modulus. Above DD1 levels of 40 mol. % the break strain (elongation ability) of the modified material increases up to four times the initial value of the unmodified polyimide.

The modulus 100% and 300% gives an indication of toughness and hardness. Compounds with a higher modulus are more resilient; generally the harder the compound, the higher the modulus. Addition of DD1 reduces the modulus 100% and 300% values, indicating that DD1 softens the polymer. This may be due to the flexible nature and interference of the chain alignment caused by the aliphatic nature and pending alkyl groups (branches) of dimer-base building blocks.

Effect of Different Dianhydrides with DD1

Polyimides were then made with different dianhydrides to assess any effect. The results are shown in Table 6.

TABLE 6

Properties of different dianhydrides with DD1

| Di-anhydride | Max. Load (MPa) | Break Strain (%) | 100% modulus (kg/cm²) | 300% modulus (kg/cm²) | Toughness (MPa) | Modulus (MPa) |
|---|---|---|---|---|---|---|
| ODPA | 17.53 | 456 | 11.03 | 16.4 | 26.17 | 14.38 |
| BTDA | 25.83 | 373.6 | 64.74 | 78.86 | 51.18 | 74.59 |
| PMDA | 17.51 | 373 | 168.3 | 137.1 | 50.69 | 289.7 |

All films were found to be transparent, except the film with ODPA as the dianhydride which was almost transparent.

Using different aromatic anhydrides in combination with DD1 does not have a significant influence on the maximum load (the strength).

The break strain shows that the combination of ODPA with DD1 results in the most flexible polyimide. This may be explained due to the presence of an ether bond between the aromatic rings of ODPA, giving some flexibility. The use of PMDA and BTDA give similar results, i.e. have a similar amount of elongation before break.

The modulus results indicate the combination of ODPA and DD1 as the most flexible. To obtain a certain elongation the least amount of force is required. When PMDA is used as dianhydride the highest force is required to achieve a certain amount of elongation. So although BTDA and PMDA have similar elongation before break, the PMDA containing polyimide is more rigid/stiff. The results indicate strongly that PMDA is the most rigid dianhydride building block of the three different anhydrides tested.

Self-Healing Testing

Polyimide was produced from ODPA with DD1, combined with some phthalic acid anhydride chain stopper, to build a 32,000 Mw polymer. Polyimide film strips were cut in half, the broken pieces lightly pressed together (manually) and left to heal, either at room temperature or at 60° C. Level of healing was measured by tensile testing. (Retained properties in %) versus the unbroken film (100% properties). Healing occurs at room temperature (25° C.) but is faster at elevated temperatures.

TABLE 7

Self-healing properties of polyimide

| Conditions | Retained Tensile Strength | Retained Elongation |
|---|---|---|
| 1 day at 60° C. | 75% | 90% |
| 1 week at 60° C. | 83% | 92% |
| 1 week at RT | 31% | 37% |

The results show good self-healing properties for the polyimides with good retained tensile strength and elongation values over time.

The use of biobased building blocks in polyimides is very limited. Incorporation of a dimer diamine building block in these polymers results in surprising self-healing properties without significant if any detrimental effect on the temperature stability. Additionally, the polyimides of the present invention allow the use of higher concentrated polyamic solutions.

As incorporation of dimer diamine tends to flexibilise polymeric material, thermosets can be modified into thermoplastics, allowing injection moulding. It is expected that high ratios of dimer diamine (i.e. >50 mol. %) are required to obtain self-healing effects at reasonable temperature (20-80° C., maximum 140° C.).

A further advantage over existing polyimides is the possibility to dissolve polyimides with a substantial amount of dimer diamine into solvents like toluene. This allows applications in which the (already cured) polyimide is directly applied onto the substrate without having the necessity of an additional imidisation step, which requires heat. This can be valuable for temperature sensitive substrates.

It is to be understood that the invention is not to be limited to the details of the above embodiments, which are described by way of example only. Many variations are possible.

The invention claimed is:

1. Polyimide formed from at least one dianhydride and at least one dimer fatty diamine and at least one aromatic diamine,
   wherein at least 50 wt. % of the total amount of diamine is comprised of dimer fatty diamine, and
   wherein at least one aromatic diamine is present in an amount of at least 5 wt. % of the total diamine,
   wherein the dimer fatty diamine has a trimer fatty triamine content of less than 1 wt. %,
   wherein the polyimide has a weight average molecular weight in the range 10,000 to 300,000, and
   wherein the at least one aromatic diamine is selected from the group consisting of 4,4'-diaminodiphenyl ether, 3,4'-diaminodiphenyl ether, 3,3'-diaminodiphenyl ether, o-tolidine, m-tolidine, 4,4'-diaminobenzanilide, p-phenylenediamine, and m-phenylenediamine.

2. The polyimide according to claim 1, wherein the dianhydride is selected from 3,3',4,4'-biphenyltetracarboxylic dianhydride, 2,3,3',4'-biphenyltetracarboxylic dianhydride, 3,3',4,4'-diphenyl ether tetracarboxylic dianhydride, 1,4-hydroquinone dibenzoate-3,3',4,4'-tetracarboxylic dianhydride, 4,4'-oxydiphtalic dianhydride, and 1,2,3,4-butanetetracarboxylic dianhydride.

3. The polyimide according to claim 1, wherein the dimer fatty diamine is formed from a corresponding dimer fatty acid.

4. The polyimide according to claim 1, wherein the dimer fatty diamine is derived from the dimerisation products of $C_{10}$ to $C_{30}$ fatty acids.

5. The polyimide according to claim 4, wherein the dimer fatty diamine is derived from the dimerisation products of $C_{16}$ to $C_{20}$ fatty acids.

6. The polyimide according to claim 1, wherein the molecular weight (weight average) of the dimer fatty diamine is in the range from 450 to 690.

7. The polyimide according to claim 1, wherein the dimer fatty diamine is derived from linear or branched unsaturated fatty acids.

8. The polyimide according to claim 7, wherein the dimer fatty diamine is derived from the dimerisation products of oleic acid, linoleic acid, linolenic acid, palmitoleic acid, or elaidic acid.

9. The polyimide according to claim 1, wherein the total amount of diamine has a dimer fatty diamine content of greater than 60 wt. %.

10. The polyimide according to claim 1, wherein the dimer fatty diamine has an amine value in the range from 140 mgKOH/g to 300 mgKOH/g.

11. The polyimide according to claim 9, wherein the dimer fatty diamine has a bulk amine functionality greater than 1.8 and less than 2.3.

12. The polyimide according to claim 9, wherein the dimer fatty diamine (at 25° C.) has a dynamic viscosity in the range from 200 to 300 mPa·s.

13. The polyimide according to claim 1, wherein the polyimide can withstand the onset of thermal decomposition (500° C-520° C.), and can withstand a tension of 50 meganewtons per square meter (MN/m$^2$), or 500 kilograms-force per square centimeter (kgf/cm$^2$), at 300° C.

14. The polyimide according to claim 1, wherein the polyimide has elastomeric properties which allow it to undergo a tensile deformation of at least 100% before break, and to recover its initial dimensions once the stress has been removed with a remnant deformation of less than 10% of its initial dimension.

15. A method of making polyimide comprising mixing:
at least one dianhydride; and
at least one dimer fatty diamine and at least one aromatic diamine,
wherein at least 50 wt. % of the total amount of diamine is comprised of dimer fatty diamine, and
wherein at least one aromatic diamine is present in an amount of at least 5 wt. % of the total diamine,
wherein the dimer fatty diamine has a trimer fatty triamine content of less than 1 wt. %,
wherein the polyimide has a weight average molecular weight in the range 10,000 to 300,000, and
wherein the at least one aromatic diamine is selected from the group consisting of 4,4'-diaminodiphenyl ether, 3,4'-diaminodiphenyl ether, 3,3'-diaminodiphenyl ether, o-tolidine, m-tolidine, 4,4'-diaminobenzanilide, p-phenylenediamine, and m-phenylenediamine.

16. The method according to claim 15, further comprising controlling the molecular weight of the formed polyimide with a chain stopper.

17. The method according to claim 15, wherein the dianhydride is selected from the group consisting of 3,3',4,4'-biphenyltetracarboxylic dianhydride, 2,3,3',4'-biphenyltetracarboxylic dianhydride, 3,3',4,4'-diphenyl ether tetracarboxylic dianhydride, 1,4-hydroquinone dibenzoate-3,3',4,4'-tetracarboxylic dianhydride, 4,4'-oxydiphtalic dianhydride, and 1,2,3,4-butane-tetracarboxylic dianhydride.

18. A coating, adhesive, or polymer film composition comprising polyimide, said polyimide being formed from at least one dianhydride and at least one dimer fatty diamine and at least one aromatic diamine,
wherein at least 50 wt .% of the total amount of diamine is comprised of dimer fatty diamine, and
wherein at least one aromatic diamine is present in an amount of at least 5 wt. % of the total diamine,
wherein the dimer fatty diamine has a trimer fatty triamine content of less than 1 wt. %,
wherein the dimer fatty diamine comprises less than 4 mg/kg of halide ions,
wherein the polyimide has a weight average molecular weight in the range 10,000 to 300,000, and
wherein the at least one aromatic diamine is selected from the group consisting of 4,4'-diaminodiphenyl ether, 3,4'-diaminodiphenyl ether, 3,3'-diaminodiphenyl ether, o-tolidine, m-tolidine, 4,4'-diaminobenzanilide, p-phenylenediamine, and m-phenylenediamine.

19. Polyimide pre-polymer, said pre-polymer being polyamic acid which is the reaction product of at least one dianhydride and at least one dimer fatty diamine and at least one aromatic diamine,
wherein at least 50 wt. % of the total amount of diamine is comprised of dimer fatty diamine, and
wherein at least one aromatic diamine is present in an amount of at least 5 wt. % of the total diamine,
wherein the dimer fatty diamine has a trimer fatty triamine content of less than 1 wt. %,
wherein the polyimide pre-polymer has a weight average molecular weight in the range 10,000 to 300,000, and
wherein the at least one aromatic diamine is selected from the group consisting of 4,4'-diaminodiphenyl ether, 3,4'-diaminodiphenyl ether, 3,3'-diaminodiphenyl ether, o-tolidine, m-tolidine, 4,4'-diaminobenzanilide, p-phenylenediamine, and m-phenylenediamine.

20. The coating, adhesive, or polymer film composition according to claim 18, wherein the dianhydride is selected from 3,3',4,4'-biphenyltetracarboxylic dianhydride, 2,3,3',4'-biphenyltetracarboxylic dianhydride, 3,3',4,4'-diphenyl ether tetracarboxylic dianhydride, 1,4-hydroquinone dibenzoate-3,3',4,4'-tetracarboxylic dianhydride, 4,4'-oxydiphtalic dianhydride, and 1,2,3,4-butane-tetracarboxylic dianhydride.

21. The polyimide pre-polymer according to claim 19, wherein the dianhydride is selected from 3,3',4,4'-biphenyltetracarboxylic dianhydride, 2,3,3',4'-biphenyltetracarboxylic dianhydride, 3,3',4,4'-diphenyl ether tetracarboxylic dianhydride, 1,4-hydroquinone dibenzoate-3,3',4,4'-tetracarboxylic dianhydride, 4,4'-oxydiphtalic dianhydride, and 1,2,3,4-butane-tetracarboxylic dianhydride.

22. A film, adhesive, coating or moulded object comprising a polyimide as claimed in claim 1.

23. The polyimide according to claim 1, wherein the polyimide is capable of self-healing at 60° C. within 1 day after receiving damage.

24. The polyimide according to claim 1, wherein the polyimide exhibits an amount of self-healing at room temperature (25° C.) within one week.

25. The polyimide according to claim 23 wherein the self-healing occurs faster at 60° C. than at room temperature.

26. The polyimide according to claim 23 wherein the amount of self-healing comprises at least one of retained tensile strength and retained elongation.

27. A self-healing polymer composition, said composition comprising polyimide formed from at least one dianhydride and at least one dimer fatty diamine and at least one aromatic diamine, wherein at least 50 wt. % of the total amount of diamine is comprised of dimer fatty diamine, and wherein at least one aromatic diamine is present in an amount of at least 5 wt. % of the total diamine, wherein the dimer fatty diamine has a trimer fatty triamine content of less than 1 wt. %, wherein the polyimide can retain at least 31% of its tensile strength by self-healing, the retained tensile strength being measured 1 week after cutting the polyimide, and wherein the at least one aromatic diamine is selected from the group consisting of 4,4'-diaminodiphenyl ether, 3,4'-diaminodiphenyl ether, 3,3'-diaminodiphenyl ether, o-tolidine, m-tolidine, 4,4'-diaminobenzanilide, p-phenylenediamine, and m-phenylenediamine.

28. The self-healing polymer composition according to claim 27, wherein the dianhydride is selected from 3,3',4,4'-biphenyltetracarboxylic dianhydride, 2,3,3',4'-biphenyltetracarboxylic dianhydride, 3,3',4,4'-diphenyl ether tetracarboxylic dianhydride, 1,4-hydroquinone dibenzoate-3,3',4,4'-tetracarboxylic dianhydride, 4,4'-oxydiphtalic dianhydride, and 1,2,3,4-butane-tetracarboxylic dianhydride.

* * * * *